(12) United States Patent
Goodwill (10) Patent No.: US 9,490,902 B2
(45) Date of Patent: Nov. 8, 2016

(54) OPTICAL POWER SYSTEM FOR DIGITAL-TO-ANALOG LINK

(71) Applicant: Dominic John Goodwill, Ottawa (CA)

(72) Inventor: Dominic John Goodwill, Ottawa (CA)

(73) Assignee: HUAWEI TECHNOLOGIES CO., LTD., Shenzhen, Guangdon (CN)

( * ) Notice: Subject to any disclaimer, the term of this patent is extended or adjusted under 35 U.S.C. 154(b) by 81 days.

(21) Appl. No.: 14/595,849

(22) Filed: Jan. 13, 2015

(65) Prior Publication Data

US 2016/0204878 A1    Jul. 14, 2016

(51) Int. Cl.
*H04B 10/516* (2013.01)
*H04B 10/50* (2013.01)
*H04J 14/02* (2006.01)

(52) U.S. Cl.
CPC .......... *H04B 10/516* (2013.01); *H04B 10/506* (2013.01); *H04B 10/5053* (2013.01); *H04J 14/02* (2013.01)

(58) Field of Classification Search
CPC . H04B 10/5053; H04B 10/516; H04J 14/02; H04Q 11/0001–11/0003; H04Q 2011/0075; G02B 27/10; G02B 27/12–27/149; G02B 2006/1215
See application file for complete search history.

(56) References Cited

U.S. PATENT DOCUMENTS 7,019,882 B1    3/2006  Wilson
7,483,205 B1    1/2009  Lundquist et al.
2010/0119239 A1    5/2010  Wang et al.
2014/0133868 A1*   5/2014  Krause ............... H04B 10/5051
                                                              398/184
2015/0125152 A1*   5/2015  Ji ............................ H04J 14/02
                                                              398/76

OTHER PUBLICATIONS

International Search Report for International Application No. PCT/CN2015/096289 dated Mar. 2, 2016.

* cited by examiner

*Primary Examiner* — David Payne
*Assistant Examiner* — Casey Kretzer
(74) *Attorney, Agent, or Firm* — Gowling WLG (Canada) LLP

(57) ABSTRACT

An optical power supply includes a plurality of lasers each providing an output at a respective optical wavelength and optical power and a plurality of optical splitter groups, each comprising an input associated with a respective one of the plurality of lasers and splitting the input into a plurality of outputs each having an output power approximated by $$Power_n = \frac{1}{x^n} Power_{input},$$

where: x is an integer greater than 1; n is a number of the outputs of the optical splitter group and n=1 . . . m; m is a total number of outputs of the optical splitter group; $Power_n$ is the output power of the $n^{th}$ output; and $Power_{input}$ is the optical power of the output of the laser received at the input of the optical splitter group.

14 Claims, 7 Drawing Sheets

OPTICAL POWER SYSTEM FOR DIGITAL-TO-ANALOG LINK

TECHNICAL FIELD

The current application relates to optical systems and, in particular, to optical power systems.

BACKGROUND

Mobile communication networks transmit data to one or more devices using radio frequency (RF) signals. The RF signals are radiated from a transmission antenna, generally located at a cellular tower or transmission site. In order to generate the RF signal the transmission antenna is driven by an analog signal. The signal to be transmitted may be communicated to the transmission site as a digital signal. An analog signal is synthesized from the digital signal and amplified in order to provide the signal for driving the transmission antenna. Receiving the transmission data as a digital signal requires equipment at the transmission site to convert the signal to an analog signal. This digital-to-analog conversion equipment is typically located in close proximity to the transmission antenna in order to prevent or reduce signal degradation by transmitting an analog signal over a length of cable.

It may be desirable to reduce the equipment necessary at the transmission antenna. Accordingly, the equipment that creates the analog signal, and the transmission antenna, may be at different locations, with cabling between the locations. It is challenging to carry an analog signal over electrical cabling, due to the large weight and poor signal integrity of electrical cables. Thus, the analog signal may be carried on an optical fiber. This and similar arrangements are known as a radio-over-fiber (RoF) system or an RF-over-fiber system.

It may be desirable to provide additional, alternative and/or improved techniques for providing an analog signal to be carried over an optical fiber.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented below.

In accordance with one aspect of the present disclosure there is provided an optical power supply that includes a plurality of lasers each providing an output at a respective optical wavelength and optical power and a plurality of optical splitter groups, each comprising an input associated with a respective one of the plurality of lasers and splitting the input into a plurality of outputs each having an output power approximated by $$Power_n = \frac{1}{x^n} Power_{input},$$

where: x is an integer greater than 1; n is a number of the outputs of the optical splitter group and n=1 . . . m; m is a total number of outputs of the optical splitter group; $Power_n$ is the output power of the $n^{th}$ output; and $Power_{input}$ is the optical power of the output of the laser received at the input of the optical splitter group.

In accordance with another aspect of the present disclosure there is provided an optical system having an optical splitting section including a plurality of optical splitter groups, each comprising an input and splitting the input into a plurality of outputs each having an output power approximated by $$Power_n = \frac{1}{x^n} Power_{input},$$

where: x is an integer greater than 1; n is a number of the outputs of the optical splitter group and n=1 . . . m; m is a total number of outputs of the optical splitter group; $Power_n$ is the output power of the $n^{th}$ output; and $Power_{input}$ is the optical power received at the input of the optical splitter group. The system also includes an optical modulation section comprising a plurality of optical modulator groups each comprising a plurality of modulator inputs and associated modulator outputs, each of the modulator groups modulating optical inputs according to an associated bit of a respective one of a plurality of data signals; and an optical interconnect section connecting individual outputs of the optical splitter groups to individual modulator inputs of the optical modulator groups, each of the plurality of modulator inputs of a respective optical modulator group connected to a respective output from different optical splitting groups such that, for each modulator group, data bit $data_i$ modulates the optical input having the $(w-i)^{th}$ highest optical power of the optical modulator group, where: $data_i$ is the $i^{th}$ bit in the data signal and i=0 . . . w−1, where $data_{w-1}$ is the most significant bit; and w is the number of bits in the data signal.

BRIEF DESCRIPTION OF THE DRAWINGS

Embodiments are described herein with reference to the appended drawings, in which.

DETAILED DESCRIPTION

In a mobile communication network, data is transmitted to mobile devices using a radio frequency (RF) transmitter. An analog RF signal is provided to a transmission antenna that radiates the signal to the respective communication clients. The analog RF signal may be provided to a cellular tower, or transmission site, in various manners. For example, the analog signal may be communicated to the transmission site as a digital representation of the desired analog signal. An analog signal is synthesized from the digital signal and its power amplified in order to provide the RF signal for driving the transmission antenna. Transmitting the analog signal representation as a digital signal requires processing equipment at the transmission site in order to convert the digital signal to an analog signal.

Alternatively, an analog signal may be transmitted to the transmission site. When an analog signal is used to transmit the data to the transmission site, it is not necessary to perform digital-to-analog conversion at the transmission site. The analog signal may be transmitted to the transmission site as an analog optical signal over fiber optic cables. The analog optical signal may be transmitted a greater distance than an electrical signal without suffering signal degradation. Accordingly, the digital-to-analog conversion of the transmission signal may be performed remote from the transmission antenna and transmitted as an optical signal. The optical analog signal may then be converted to an electrical signal and amplified in order to drive the transmission antenna. If there are multiple transmission antennae, then multiple optical signals may be used; although it is possible for a single analog signal to drive multiple transmission antennae. Similarly, a single transmission antenna may be driven by multiple analog signals. When a single antenna is driven by multiple analog signals, the analog signals may drive the single antenna at different times, or the analog signals may have non-overlapping wavelengths to allow driving the same antenna at the same time. The use of analog optical signals for transmitting the signals for driving the transmission antennae may reduce the amount of equipment required at the transmission antennae since it is not necessary to first convert a digital signal to an analog signal.

An analog signal may be synthesized from a digital signal representing the desired analog signal. The digital signal may comprise a time series of digital words, providing a digital word stream. Each digital word may comprise a plurality of data bits, providing a plurality of digital bit streams. A digital signal may be converted to an analog optical signal by modulating an optical carrier wave so that the optical power of the carrier wave corresponds to the magnitude of the digital signal. An optical power supply provides un-modulated optical carrier wave that can be modulated according to the digital signal.

The analog signal may be provided as a modulated carrier wave of a single wavelength, or may be provided as a multiplexed signal of a plurality of carrier waves. When a single analog signal is provided by multiplexing a plurality of individual optical carrier waves together, each optical carrier wave used for an analog signal may have a different wavelength and may be modulated according to a bit of the digital signal. The modulated optical carrier waves may then be multiplexed together into a single analog optical signal corresponding to the data signal.

To carry multiple analog signals that emanate from the same location, there may be multiple digital-to-analog transmitters that synthesize an optical analog signal from a digital signal. As described further herein, multiple high-power lasers may provide optical carrier waves at respective wavelengths. The optical carrier waves output by the lasers may be shared across the multiple digital-to-analog transmitters by means of optical power splitting before the carrier waves are modulated by the digital signal.

The use of a relatively small number of high-powered lasers to provide all of the optical carrier waves for modulating multiple analog signals may provide savings in terms of cost and/or size. That is, a small number of high-power lasers may be less costly than a large number of low-power lasers. Similarly, a small number of high-power lasers may require less space than a large number of low-power lasers, which may simplify the installation of the required components. Further, the technical requirements of the analog RF signal for transmission, and so the technical requirements of the analog optical signal, may be demanding. In particular, the lasers providing the optical carrier waves should have very low relative intensity noise (RIN) in the important frequency range, which in the case of cellular transmission is in the range of 1 GHz. Meeting the requirements may be easier, and possibly more cost effective, using a small number of high-powered lasers, as the RIN of a laser generally decreases in the important frequency range as the laser is operated at higher power. Further, the use of high-powered lasers may provide sufficiently high optical power to overcome photon statistical shot noise at the receiver.

As described further, below, an optical power system for use in a digital-to-analog optical transmission environment may include a number of high-powered lasers, each of differing wavelengths. The output of each of the lasers is split into a number of ports each with differing power. Each of the output ports from the laser splitting may be modulated according to a bit of a data signal. The modulated optical carrier waves for the bits of a data signal may then be multiplexed together to provide the analog optical signal for transmission. As described in further detail below, different optical wavelengths provided from different lasers may used to modulate individual bits of particular signal.

Figure 1:
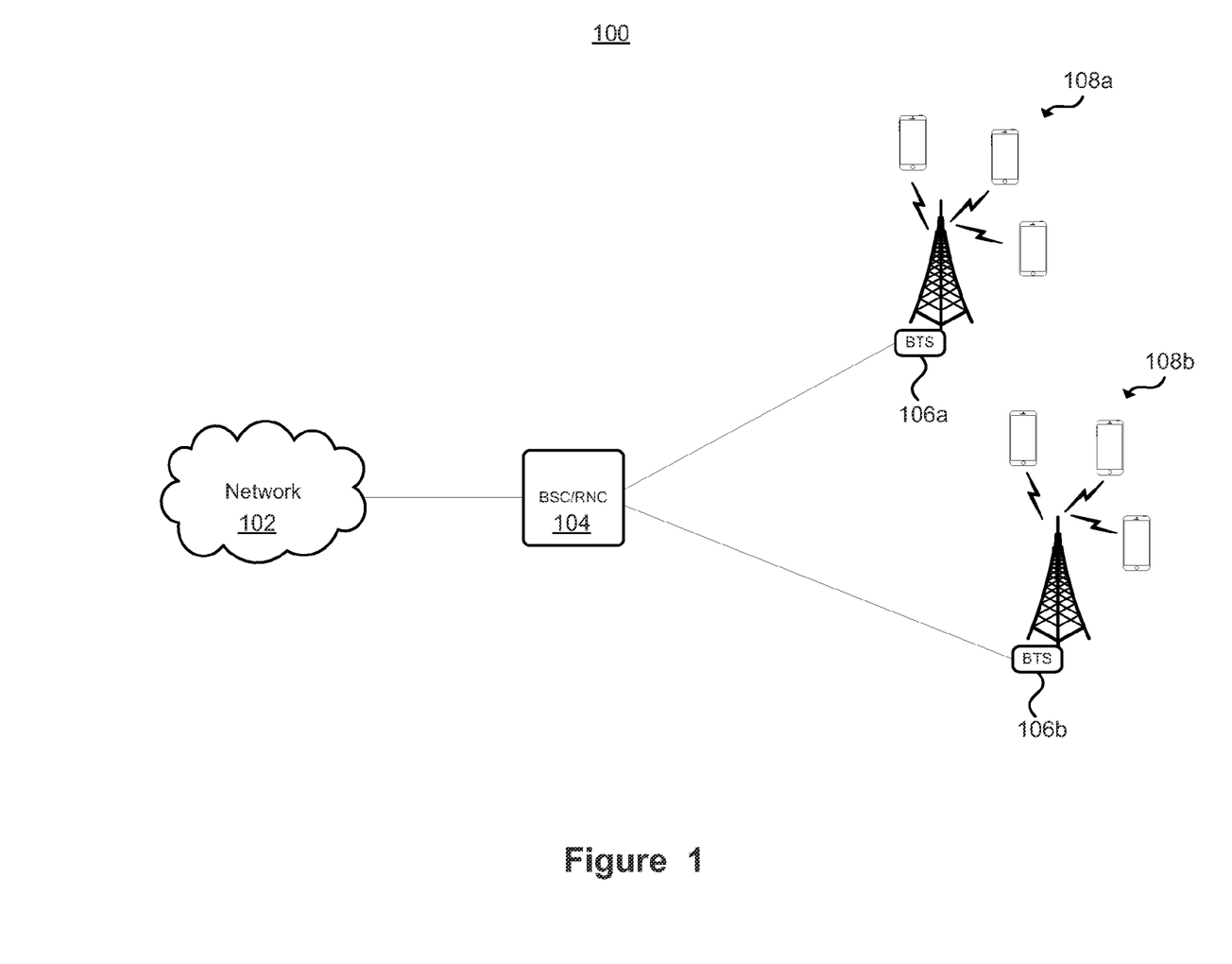
FIG. 1 depicts an environment in which embodiments of the invention may be utilized.

FIG. 1 depicts an environment in which the described optical power system may be utilized. The environment 100 depicted is a mobile communication network. The mobile communication network includes a network 102, which may include various systems for controlling and coordinating the communication network. For example, the network 102 may include computing devices for providing data or other services, such as a web server. Although depicted as exterior to the network 102, the additional components depicted in FIG. 1 may be considered as part of the network 102. Base station controllers (BSC) and/or radio network controllers (RNC) 104, depending upon the network technology, control a number of transmission sites. The BSC/RNC 104 communicates with communication equipment located at the transmission site, depicted as base transceiver stations (BTS) 106a, 106b (referred to collectively as BTS 106). Broadly, the BTS 106 receives data for transmission from, for example, BSC/RNC 104 and provides the analog RF signal for driving a transmission antenna. The transmitted RF signals are received by one or more mobile devices 108a, 108b associated with the respective BTS 106. Previously, the analog signal for driving the transmission antenna was generated in close proximity to the transmission antenna in order to avoid signal degradation caused by transmission of an analog electrical signal. Accordingly, communication equipment for performing the digital-to-analog conversion was required at the transmission antenna. By providing the analog signal as an optical signal, longer transmission lengths are possible without significant signal degradation. Accordingly, it is possible to place the digital-to-analog conversion equipment at a location remote from the transmission antenna, and only provide optical to electrical conversion components and power amplifiers in the vicinity of the transmission antenna.

The optical power system described herein may be used in providing the analog signals for use in driving transmission antennae. The optical power system provides un-modulated optical carrier waves at different power levels and wavelengths using a relatively small number of high powered lasers. The outputs from the lasers may be split into a number of ports and the carrier waves from the ports may be modulated according to bits of the digital signals. The generated optical analog signals may be transmitted a relatively short distance, for example from the base of a transmission tower to the top of the transmission tower where the antenna is located. Additionally, or alternatively, the analog optical signal may be transmitted a longer distance such as a few kilometers or tens of kilometers. Regardless of the specific length of transmission of the analog optical signal, the optical power system described herein may be used in generating analog optical signals from a digital representation of the signal for transmission remote from the transmission antenna location. The analog optical signals may be transmitted over an transmission link, which may be a fiber optic cable.

The environment 100 depicted in FIG. 1 is an oversimplification of a mobile communication network intended to provide a basic overview of an environment in which the optical power system may be used. Further, although described in terms of its use in a mobile communication network, the optical power system described further herein may be used in other applications in which it is desirable to provide analog optical signals that are synthesized from digital representations. Such applications may include, for example, cable television head-end transmission, supplying wireless communications to remote areas, or areas where wireless backhaul is not available, as well as other possible applications.

Figure 2:
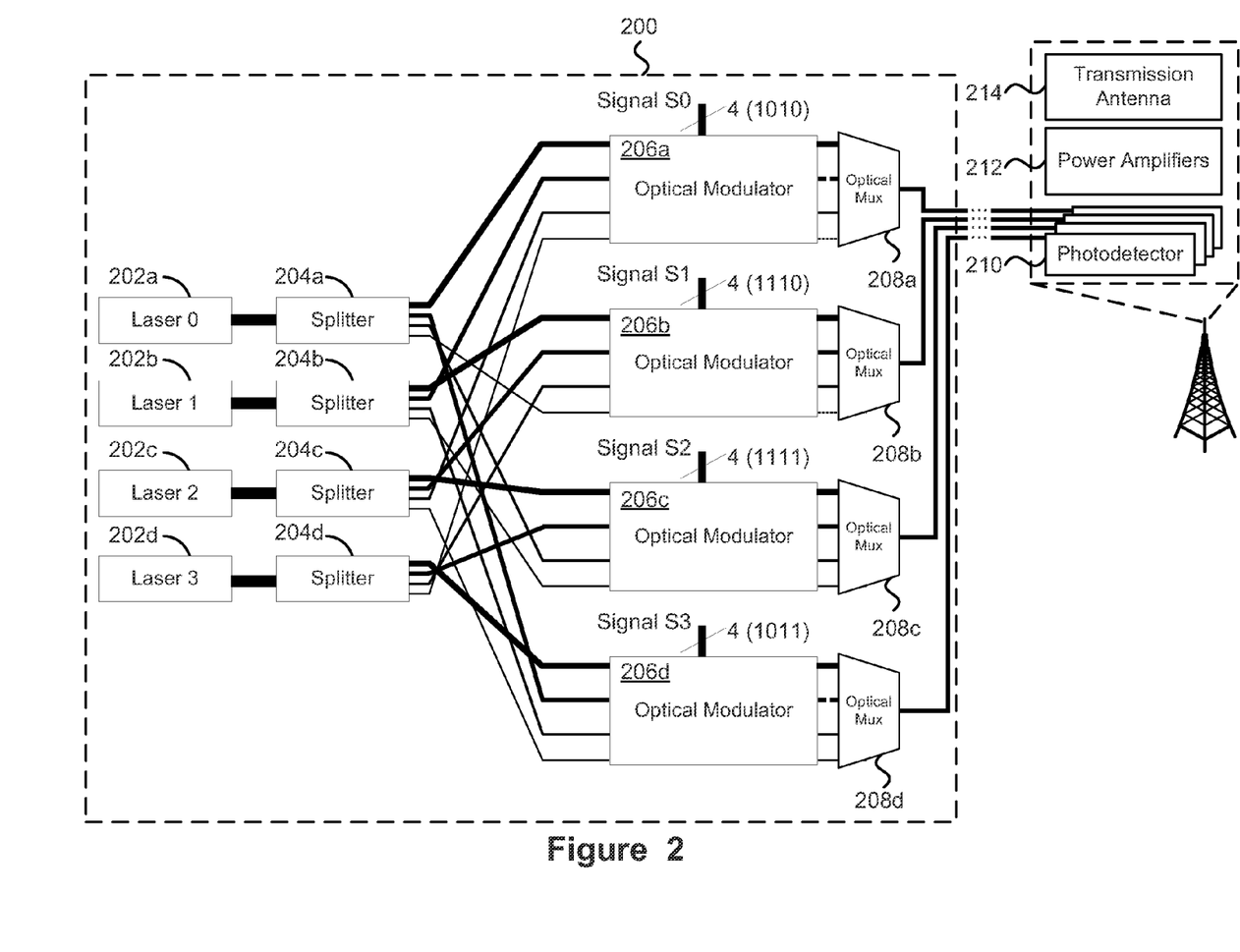
FIG. 2 depicts components of an optical power system for a digital-to-analog communication link.

FIG. 2 depicts components of an analog optical transmitter system. The analog optical transmitter system 200 comprises an optical power supply that provides un-modulated optical carrier waves to optical modulators that modulate the carrier waves according to digital signals. The optical power supply may comprise a number of high-power lasers 202a, 202b, 202c, 202d (referred to collectively as lasers 202) and a plurality of optical splitter groups 204a, 204b, 204c, 204d (referred to collectively as optical splitter groups 204). The output of each laser is connected to a respective one of the optical splitter groups 204. Each of the optical splitter groups 204 splits the input into a number of output ports of differing power, which is represented schematically by the thickness of the line in FIG. 2.

The output ports of the optical splitter groups 204 are connected to modulator inputs of a number of optical modulator groups 206a, 206b, 206c, 206d (referred to collectively as optical modulator groups 206). Each of the optical modulator groups 206 modulate the optical carrier waves from the inputs according to individual bits of respective digital signals S0-S3 associated with the respective one of the optical modulator groups 206.

The optical modulator groups 206 provide output ports for the modulated optical carrier waves and the output ports are connected to respective optical multiplexer groups 208a, 208b, 208c, 208d (referred to collectively as optical multiplexer groups 208). Each of the optical multiplexer groups 208 multiplex the modulated optical carrier waves from one of the optical modulator groups together into a single analog optical signal that can be transmitted over a fiber optic transmission link.

The analog optical signals provided by the optical multiplexers 208 may be transmitted to a transmission antenna location, where a respective photo detector 210 converts the optical signal into a corresponding electrical signal. The electrical signals from the photo detectors 210 may be amplified by power amplifiers 212 and the amplified signals used to drive transmission antennas 214. The analog optical transmitter system 200 may be located remote from the transmission antenna 214. For example, the analog optical transmitter system 200 may be located at a base of a cellular tower on which the transmission antenna is located. Additionally or alternatively, the analog transmitter system 200 may be located remotely from the transmission site. The lasers 202 may be co-located with the optical modulators 206 and optical multiplexers 208, or may be located separately from other components such as the splitter groups 204, optical modulator groups 206 and optical multiplexers 208. The performance of the lasers 202 may be more susceptible to changing environmental conditions and as such may be located in a more highly regulated environment to ensure optimal, or at least acceptable operation is maintained. The optical splitter groups, optical modulators and optical multiplexers may be more robust with regard to sensitivity to environmental conditions and as such may be located in a wider range of locations. The optical splitter groups, optical modulators and optical multiplexers may located together or separately and may be co-located with the lasers 202 of may be located separately.

FIG. 2 depicts 4 lasers 202 used to modulate 4 data signals S0-S3, which are transmitted over respective transmission links to the photo detectors 210 in the vicinity of the transmission antenna 214. Similarly, each of the optical modulator groups 206 are depicted as modulating a 4 bit word. The optical power system 200 is depicted using 4 lasers to modulate 4 digital signals each of 4 bits for clarity and simplicity of the Figure. The analog optical transmitter system 200 may be extended to convert more digital signals each having more bits into corresponding analog optical signals. Generally, the number of bits in a word being modulated may correspond to the number of output ports provided by each of the optical splitter groups 204, although such correspondence is not necessary. Similarly, the number of optical fiber transmission links between the analog optical transmitter system 200 and the photo detectors may correspond to the number of lasers in the optical system 200. If the number of fiber optic transmission links is not equal to the number of bits in a word, there may be more laser wavelengths than the number of bits. If there is a large number of fiber optic transmission links, then there may be multiple lasers of each wavelength, and the laser power delivery fibers may be assigned across all of the fiber optic transmission links, or the fiber optic transmission links may be handled in subsets.

The optical lasers 202 may be provided by different types of lasers. For example, the lasers may be distributed feedback (DFB) semiconductor lasers, fiber lasers or other types of lasers. Although different types of lasers may be used, fiber lasers may be desirable as they are capable of providing low optical noise, which may be advantageous for an analog optical link having high dynamic range. Typically, fiber lasers provide higher powered output than necessary for modulating a single bit of a data signal.

The optical splitter groups 204 of the analog optical transmitter system 200 split the outputs of the lasers 202 into a number of outputs that are distributed to different optical modulator groups 206. The optical carrier waves output from each of the lasers 202 may have substantially the same optical power, but at different wavelengths. Each of the digital signals are modulated by an individual optical modulator group 206, with each bit of the particular digital signal being used to modulate an optical carrier wave having a different wavelength and power from other bits of the data signal. For example, optical modulator 206a is depicted as receiving 4 different un-modulated carrier waves from the optical splitter groups 204. Each of the carrier waves of the optical modulator 206a may be a different wavelength as well as a different power. The optical modulator 206a modulates the highest powered optical carrier wave power using the most significant bit of the digital signal. The second highest powered optical carrier wave is modulated with the second most significant bit of the digital signal. The second lowest powered optical carrier wave is modulated with the second least significant bit of the digital signal, and the lowest powered optical carrier wave is modulated with the least significant bit of the digital signal.

In order to avoid generating beat frequencies when the modulated optical carrier waves are multiplexed together, the wavelengths of the optical carrier waves must be sufficiently separated. Practical optical carrier wave separation is 100 GHz or 200 GHz, because lasers and optical multiplexers with such separation are commonly available from manufacturers of dense wavelength division multiplexing components, or 500 GHz to 2 THz using commonly available coarse wavelength division multiplexing components. The practical optical carrier separation is sufficient to avoid beating between the modulated optical signals.

The un-modulated optical carrier waves output of each of the lasers 202 is provided to a respective one of the optical splitter groups 204 that splits the input to the splitter group into a number of output ports that provide individual optical carrier waves of differing optical power that may be used in modulating the data bits of digital signals. Each of the optical splitter groups 204 is arranged so that each of the output ports provides approximately ½ the optical power of the previous output port, with the first output port having approximately ½ the optical power of the input. That is, each optical splitter group is arranged so that the power of each of the output port is approximately:

$$Power_n = \frac{1}{x^n} Power_{input},$$

where:
x is an integer greater than 1;
n is a number of the output port of the optical splitter group and n=1 ... m;
m is a total number of output ports of the optical splitter group;
$Power_n$ is the optical power of the $n^{th}$ output port; and
$Power_{input}$ is the optical power of the output of the laser received at the input of the optical splitter group.

In the above equation, x is generally selected to be 2 so that the power of the output ports provides a binary sequence of powers. Although a binary sequence of power outputs may be conveniently used to modulate binary digital signals, other fractional sequences of the power output may be useful in other scenarios.

When the modulated optical carrier waves from a modulation group are multiplexed together into the analog optical signal, the total optical power of the optical analog signal across all wavelengths is proportional to the amplitude of the digital signal, which in turn is a digital representation of a desired analog signal for driving an antenna. Accordingly, when the analog optical signal is detected by the associated photo detector 210 and converted into an electrical signal, the resultant electrical signal corresponds to the desired analog signal for driving the antenna.

Figure 3:
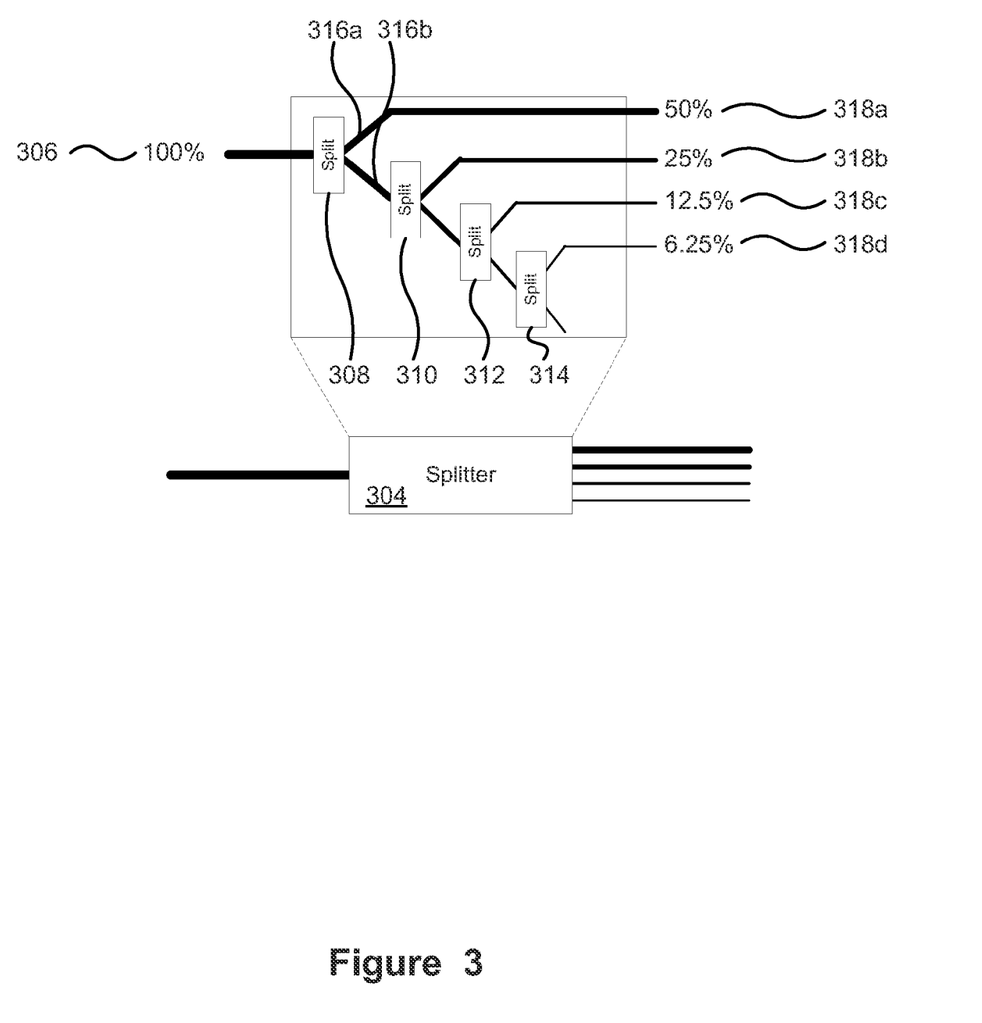
FIG. 3 depicts components of an optical splitter that may be used in the optical power system.

FIG. 3 depicts components of an optical splitter group that may be used in the optical power system. The optical splitter group 304 may be used for the optical splitter groups 204. The optical splitter group 304 is arranged as an asymmetric tree of individual optical splitters 308, 310, 312, 314 that each split the power of the received optical carrier into two optical carrier waves. The optical splitters 308, 310, 312, 314 are depicted as spitting the optical power into nearly equal optical carrier waves. As depicted the input optical signal 306 is split in approximately half by the first individual optical splitter 308 into two outputs 316a, 316b. One of the outputs, 316a, is provided as the highest power output 318a of the optical splitter group 304 and provides approximately ½ the optical power of the input. The second output, 316b, of the initial optical splitter 308 is provided as input to a second optical splitter 310, which in turn splits the input into two outputs, one of which is provided as the output 318b of the optical splitter group. The second output is provided to the input of the third optical splitter 312, which splits the input into two outputs, one of which is provided as the output 318c of the optical splitter group. The second output is provided to the input of the fourth optical splitter 314, which splits the input into two outputs, one of which is provided as the output 318d of the optical splitter group. The second output of the last optical splitter may not used. Although only 4 optical splitters are depicted in FIG. 3, additional splitters may be included in order to provide sufficient outputs of the optical splitter group.

As described above, the outputs 318a, 318b, 318c, 318d (referred to collectively as outputs 318) are provided by near 50/50 optical splitters 308, 310, 312, 314. However, in practice, it is desirable for the power to be split slightly unevenly so that more power is provided to the output branch having the additional optical splitters to account for optical power loss in each splitter. Although the outputs 318 are depicted as a percentage of the input, it will be appreciated that these may be approximations that assume the optical splitters are perfect 50/50 splitters. The individual optical splitters are arranged so that each of the outputs has ½ the power of the preceding output. The highest power output may be approximately 50% the power of the input; however, it may be slightly less so that more power is provided to the branch having additional optical splitters. The additional power accounts for optical losses incurred by each of the optical splitters.

Figure 4:
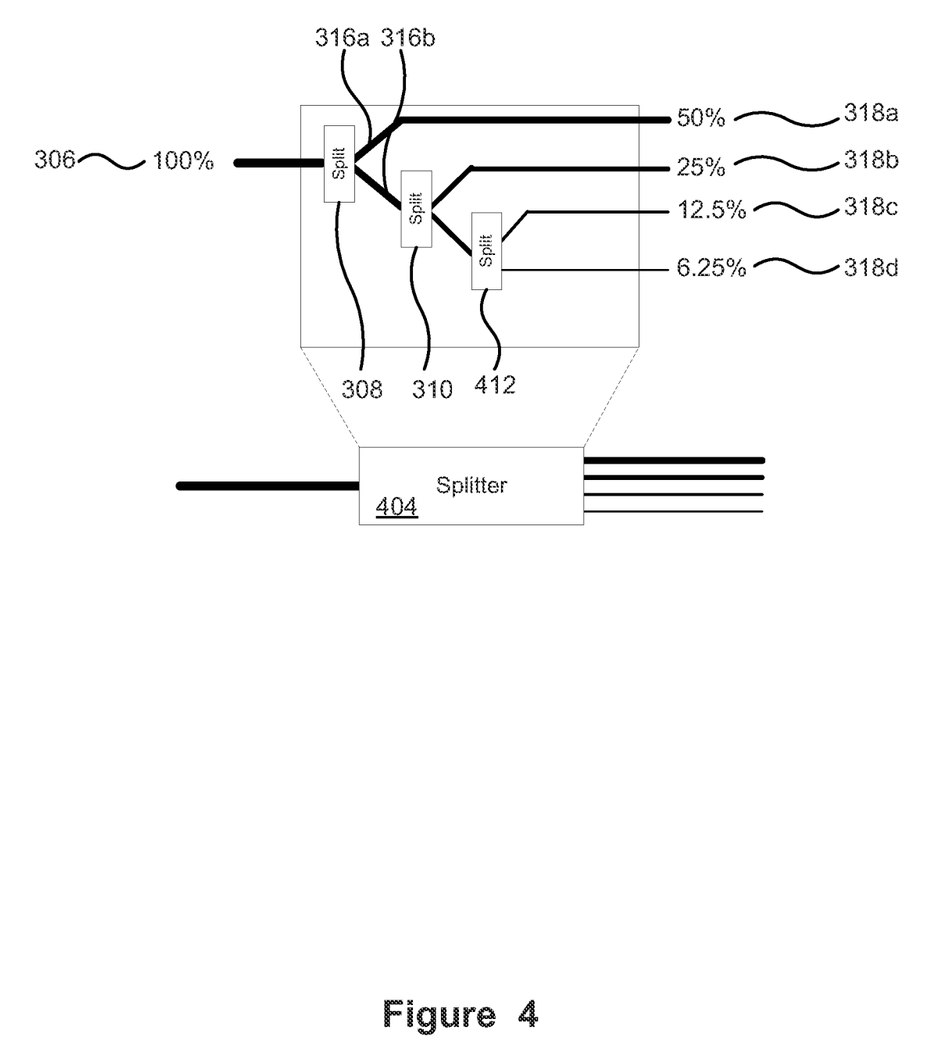
FIG. 4 depicts components of a further optical splitter that may be used in the optical power system.

FIG. 4 components of an alternative optical splitter group that may be used in the optical power system. The optical splitter group 404 is substantially similar in functionality to the optical splitter group described in FIG. 3. However, as depicted in FIG. 3, individual optical splitter 314 spits the optical carrier wave into two optical carrier waves, one of which is not used. In order to reduce an amount of wasted optical power, the last optical splitter 314 may be omitted and the approximate 50/50 optical splitter 312 may be replaced with optical splitter 412 that splits the optical power unevenly into the final outputs 318c, 318d. Optical splitter 412 may spit the optical power in an approximate 67:33 ratio so that approximately ⅔ of the optical power is provided to output 318c and approximately ⅓ of the optical power is provided to optical output 318d. Generally, the number of individual optical splitters in an optical splitter group may be one less than the number of output ports of the group.

Returning to FIG. 2, the outputs of the optical splitter groups 204 are connected to different optical modulator groups 206. Each of the optical modulators 206 modulates each bit of the respective data signal S0-S3 using a different laser wavelength. The modulated wavelengths are multiplexed by a respective optical multiplexer 208 to provide the analog optical signal that is transmitted over an optical transmission link. Since the bits of each data signal are modulated using optical signals whose power is a binary sequence, the power across all wavelengths of the multiplexed optical signal is an analog representation of the data signal.

Figure 5:
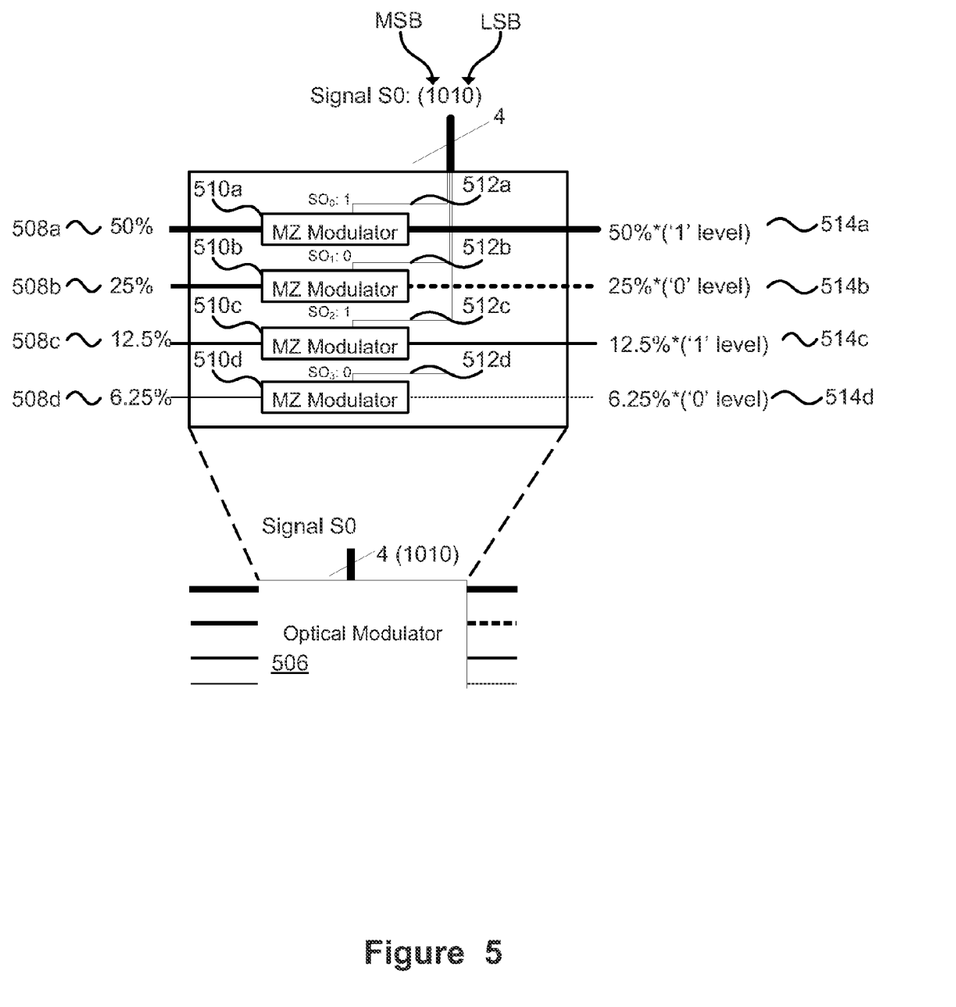
FIG. 5 depicts components of an optical modulator that may be used in the optical power system.

FIG. 5 depicts components of an optical modulator group that may be used in the optical power system. The optical modulator group 506 may be used for the optical modulator groups 206 described above in FIG. 2. The optical modulator group 506 receives a plurality of inputs 508a, 508b, 508c, 508d (referred to collectively as inputs 508). Each of the inputs 508 is modulated according to a single bit of the data signal being transmitted. As depicted in FIG. 5, the signal S0 being transmitted comprises 4 bits, which are depicted as the bit string '1010', and as such the optical modulator group 506 comprises 4 inputs 508 and modulators. Generally, the number of inputs and associated individual modulators will correspond to the number of bits of the digital signal. However, it is possible to configure a modulator with more inputs and individual modulators to be used to modulate a digital signal with fewer bits. The inputs 508 receive respective un-modulated optical carrier waves from the optical splitter groups associated with different laser. Accordingly, each of the inputs is associated with a different wavelength. Further, the power provided by the optical splitter groups to each of the inputs differs. For example, the first input 508a receives an optical carrier wave of a first wavelength at approximately ½ the optical power output by the lasers. Similarly, the second input 508b receives an optical carrier wave of a second wavelength at approximately ¼ the optical power output by the lasers. The third input 508c receives an optical carrier wave of a third wavelength at approximately ⅛ the optical power output by the lasers. The fourth input 508d receives an optical carrier wave of a fourth wavelength at approximately ¹⁄₁₆ the optical power output by the lasers. As depicted in FIG. 2, the different power outputs provided by an individual optical splitter group are distributed to different optical modulator groups, which provides for sharing of the optical power from a powerful laser among multiple optical modulator groups.

The optical modulator group 506 includes a number of individual optical modulators 510a, 510b, 510c, 510d (referred to collectively as optical modulators 510) for modulating the optical signal from a respective one of the inputs in accordance with a corresponding bit of the data signal. The optical modulator group 506 modulates the highest power optical input, namely input 508a, using the most significant bit, $S0_3$ 512a, of the digital signal. The optical modulator group 506 modulates the second highest power optical input, namely input 508b, using the second most significant bit, $S0_2$ 512b, of the digital signal. The optical modulator group 506 modulates the second lowest power optical input, namely input 508c, using the second least significant bit, $S0_1$ 512c, of the digital signal. The optical modulator group 506 modulates the lowest power optical input, namely input 508d, using the least significant bit, $S0_0$ 512d, of the digital signal. The optical modulator group 506 provides the modulated input carrier waves as outputs 514a, 514b, 514c, 514d of the modulator group.

The individual optical modulators 510 may be provided by a Mach-Zehnder (MZ) modulator. The individual optical modulators 510 modulate the power of the respective input carrier wave based on the associated bit of the digital signal. The output of each individual modulator will depend upon the optical power of the input carrier wave and the bit value. This is represented in FIG. 5 by the respective optical power of the input (50%, 25%, 12.5%, 6.25%) multiplies by the modulation level for a '0' bit or a '1' bit.

Returning to FIG. 2, the outputs of each optical modulator group 206 are combined together into analog optical signals. Optical multiplexer groups 208 are associated with each of the optical modulator groups 206 in order to provide an analog optical signal corresponding to the data signal modulated by the optical multiplexer group. The outputs from each of the optical multiplexers 208 is transmitted to the transmission site over a respective fiber optic transmission link. Each fiber optic transmission link carries an analog optical signal. A number of carrier waves of different wavelengths are combined together at the optical multiplexer in order to provide the analog optical signal corresponding to a digital signal representation of a driving signal. A photo detector may detect the analog optical signal provide an electrical output that is proportional to the optical power of all wavelengths of the analog optical signal. The resultant electrical signal from the photo detector corresponds to an analog electrical signal of the digital signal.

Figure 6:
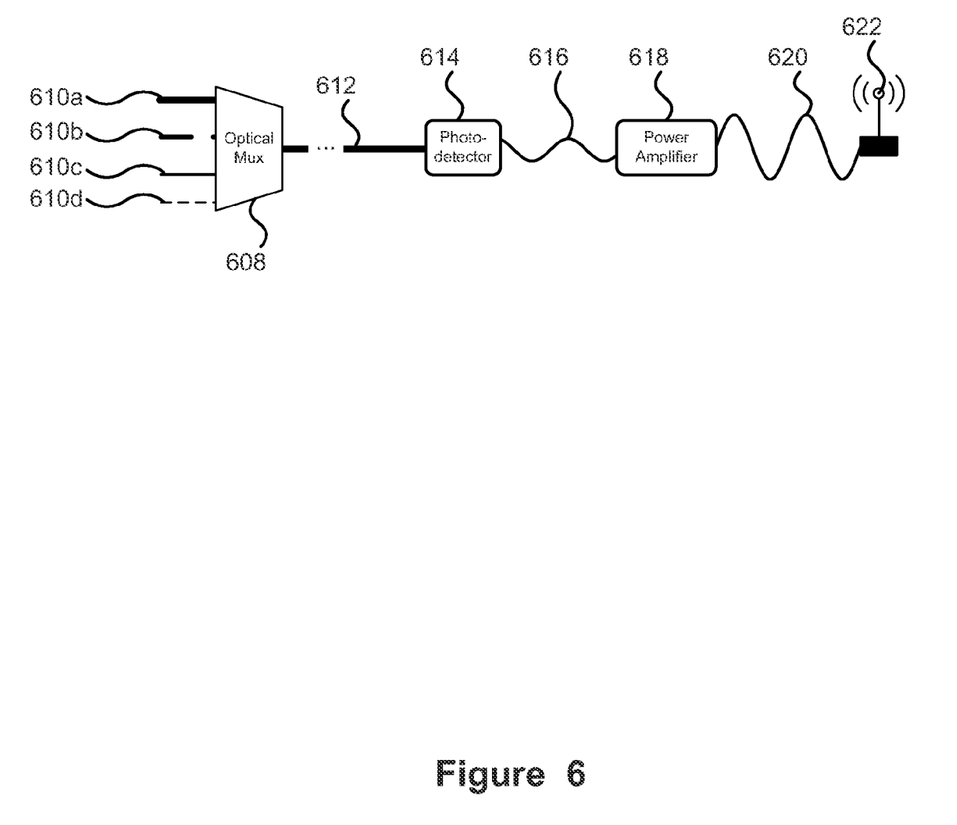
FIG. 6 depicts components of the digital-to-analog communication link.

FIG. 6 depicts components of the digital-to-analog communication link. As depicted by way of example in FIG. 6, an optical multiplexer 608 receives a plurality of inputs 610a, 610b, 610c, 610d (referred to collectively as inputs 610) from an optical multiplexer group, such as the optical multiplexer groups depicted in FIG. 2. The inputs 610 correspond to individual bits of a data signal, which is depicted as being a 4-bit signal. The inputs 610 are received at the optical multiplexer 608 and combined together into a single optical signal 612. Each of the optical signals of the input 610 may have different wavelengths that are separated from each other in order to avoid generating any beat frequencies in the output when combined together. The combined optical signal 612 is transmitted over a transmission link to a photo detector 614. The photo detector generates an electrical signal 616 having an amplitude corresponding to the total power across all wavelengths of the combined optical signal 612. The electrical signal 616 may be amplified by one or more power amplifier components 618 to provide an analog driving signal 620 that is provided to the transmission antenna 622, and causes the transmission antenna 622 to radiate the RF signal.

Figure 7:
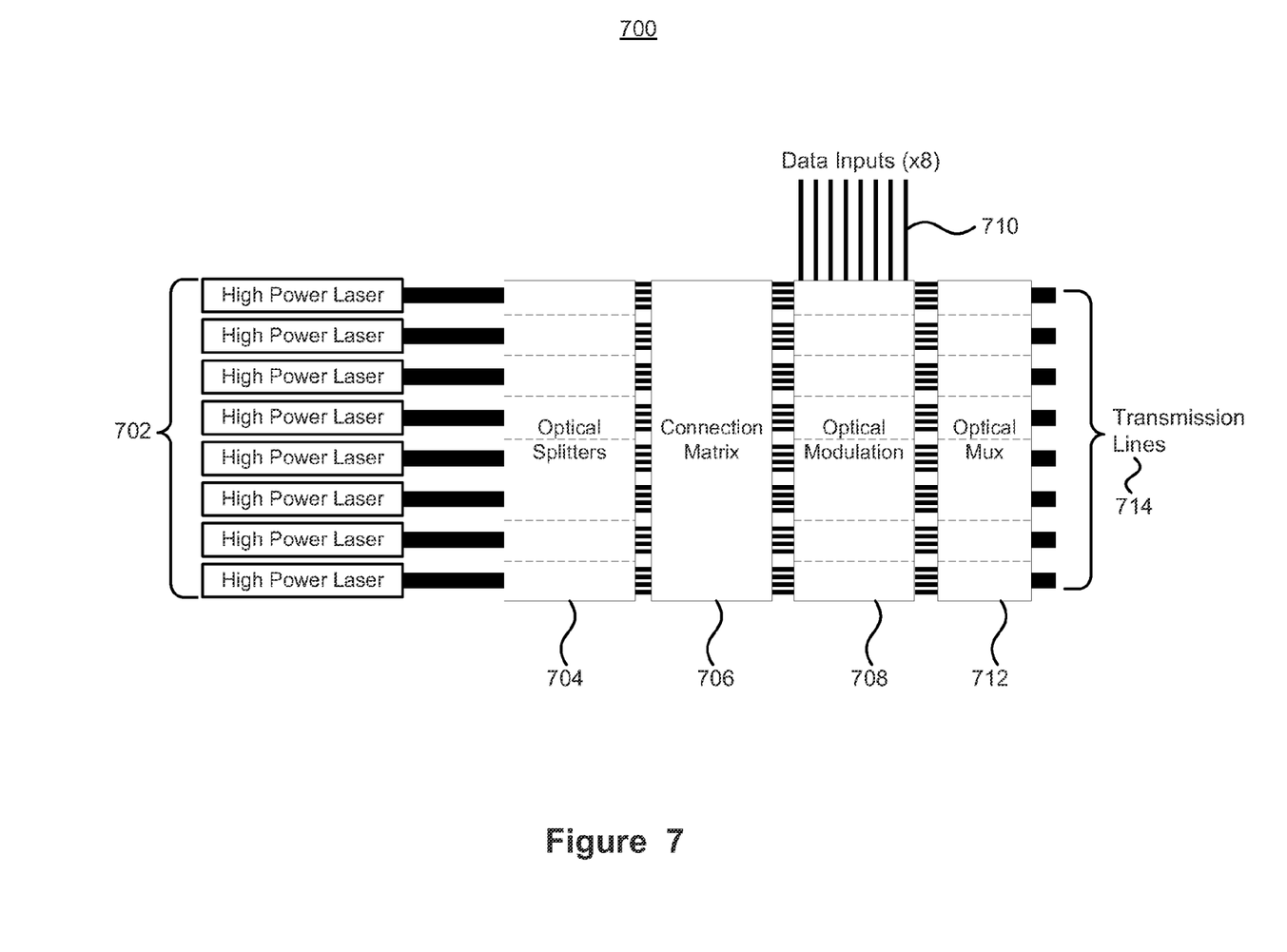
FIG. 7 depicts components of a further optical power system for a digital-to-analog communication link.

FIG. 7 depicts components of a further optical power system for a digital-to-analog communication link. The optical power system 700 converts digital data signals to corresponding analog optical signals that may be transmitted to a receiver over individual transmission lines. The optical power system 700 comprises a plurality of high-power lasers 702. The number of high-power lasers may correspond to the number of data signals being converted to corresponding analog signals. Each of the high-power lasers 702 generate an optical signal with a particular wavelength and power. The wavelength generated by each of the high-power lasers 702 is different, and may be separated from other wavelengths by a sufficient distance to avoid generating beat frequencies when the optical signals are combined. The power of each of the optical signals generated by each of the different lasers 702 is substantially the same.

The output of each of the lasers 702 is provided to an optical splitter section 704. The optical splitter section may comprise a number of individual optical splitters arranged in optical splitter groups to provide a plurality of optical outputs for each input from the lasers 702. The optical splitter section 704 splits each of the inputs into a plurality of output ports so that the optical power of the output ports are a binary sequence. The highest power output port may be some fraction of the input power provided by the laser, which is described as approximately ½ the input power for convenience, although it need not be ½ half the input power. The power of each subsequent output is ½ the power of the next highest power output. The number of output ports the optical splitter sections provides for each laser input may correspond to the number of bits in the data signals being modulated. For example, if the data signal comprises an 8-bit signal, the optical splitter section 704 may split each laser input into 8 output ports. The output power of the 8 ports would be approximately proportional to $$\frac{1}{2^1}, \frac{1}{2^2}, \frac{1}{2^3}, \frac{1}{2^4}, \frac{1}{2^5}, \frac{1}{2^6}, \frac{1}{2^7}, \frac{1}{2^8}$$

of the input power. The output power summed across all 8 channels would be approximately equal to the total input power minus the optical losses incurred by the optical splitters.

The individual outputs from the optical splitter section 704 may be provided to a connection matrix section 706 that connects the outputs to individual inputs of an optical modulation section 708. The connection matrix section 706 may be provided in various manners including as optical waveguides or individual optical fibers. Regardless of the specific manufacture of the connection matrix, the plurality of output channels of the optical splitter section 704 are connected to individual modulator inputs of the optical modulation section 708.

The optical modulation section 708 receives the outputs from the optical splitter section 704 and modulates the individual optical signals according to the data inputs 710. As depicted, the optical modulation section 708 receives 8 data signals, each of which may comprise 8 bits. If the optical splitter section splits the optical signal from each laser into 8 output channels, the optical modulation section 708 modulates the optical signals as depicted in Table 1.

TABLE 1

Table showing optical signal assignment for bit modulation

| Data Signal | Bit | Wavelength | Power | Data Signal | Bit | Wavelength | Power |
|---|---|---|---|---|---|---|---|
| 1 | 7 (MSB) | WL 1 | 1/2 | 2 | 7 (MSB) | WL 2 | 1/2 |
| 1 | 6 | WL 2 | 1/4 | 2 | 6 | WL 3 | 1/4 |
| 1 | 5 | WL 3 | 1/8 | 2 | 5 | WL 4 | 1/8 |
| 1 | 4 | WL 4 | 1/16 | 2 | 4 | WL 5 | 1/16 |
| 1 | 3 | WL 5 | 1/32 | 2 | 3 | WL 6 | 1/32 |
| 1 | 2 | WL 6 | 1/64 | 2 | 2 | WL 7 | 1/64 |
| 1 | 1 | WL 7 | 1/128 | 2 | 1 | WL 8 | 1/128 |
| 1 | 0 (LSB) | WL 8 | 1/256 | 2 | 0 (LSB) | WL 1 | 1/256 |
| 3 | 7 (MSB) | WL 3 | 1/2 | 4 | 7 (MSB) | WL 4 | 1/2 |
| 3 | 6 | WL 4 | 1/4 | 4 | 6 | WL 5 | 1/4 |
| 3 | 5 | WL 5 | 1/8 | 4 | 5 | WL 6 | 1/8 |
| 3 | 4 | WL 6 | 1/16 | 4 | 4 | WL 7 | 1/16 |
| 3 | 3 | WL 7 | 1/32 | 4 | 3 | WL 8 | 1/32 |
| 3 | 2 | WL 8 | 1/64 | 4 | 2 | WL 1 | 1/64 |
| 3 | 1 | WL 1 | 1/128 | 4 | 1 | WL 2 | 1/128 |
| 3 | 0 (LSB) | WL 2 | 1/256 | 4 | 0 (LSB) | WL 3 | 1/256 |
| 5 | 7 (MSB) | WL 5 | 1/2 | 6 | 7 (MSB) | WL 6 | 1/2 |
| 5 | 6 | WL 6 | 1/4 | 6 | 6 | WL 7 | 1/4 |
| 5 | 5 | WL 7 | 1/8 | 6 | 5 | WL 8 | 1/8 |
| 5 | 4 | WL 8 | 1/16 | 6 | 4 | WL 1 | 1/16 |
| 5 | 3 | WL 1 | 1/32 | 6 | 3 | WL 2 | 1/32 |
| 5 | 2 | WL 2 | 1/64 | 6 | 2 | WL 3 | 1/64 |
| 5 | 1 | WL 3 | 1/128 | 6 | 1 | WL 4 | 1/128 |
| 5 | 0 (LSB) | WL 4 | 1/256 | 6 | 0 (LSB) | WL 5 | 1/256 |
| 7 | 7 (MSB) | WL 7 | 1/2 | 8 | 7 (MSB) | WL 8 | 1/2 |
| 7 | 6 | WL 8 | 1/4 | 8 | 6 | WL 1 | 1/4 |
| 7 | 5 | WL 1 | 1/8 | 8 | 5 | WL 2 | 1/8 |
| 7 | 4 | WL 2 | 1/16 | 8 | 4 | WL 3 | 1/16 |
| 7 | 3 | WL 3 | 1/32 | 8 | 3 | WL 4 | 1/32 |
| 7 | 2 | WL 4 | 1/64 | 8 | 2 | WL 5 | 1/64 |
| 7 | 1 | WL 5 | 1/128 | 8 | 1 | WL 6 | 1/128 |
| 7 | 0 (LSB) | WL 6 | 1/256 | 8 | 0 (LSB) | WL 7 | 1/256 |

The modulated output for each bit of the data signals is provided to an optical multiplexer section 712 that combines the individual modulated outputs for a data signal into a single optical signal that may be transmitted over a corresponding transmission line 714.

In the embodiments illustrated by way of example in FIGS. 2 to 7, the apparatus for providing optical power to multiple wavelength additive analog transmission includes a bank (or group) of lasers, whose power is split in binary sequence by optical splitters, coupled to a bank (or group) of modulators. In these embodiments, the output of each laser is split unequally into separate laser delivery fibers. A ratio of optical power in the fibers is a power of 2 sequence times the lowest power. The wavelength assignment per bit rotates so that all the optical power is utilized.

In one implementation, a variable optical attenuator may be provided on each power splitter output waveguide to compensate for imperfect splitting ratios and any variations in optical modulator transmission and amplitude-response. Alternatively, or additionally, the attenuator may be combined with a feedback monitor, e.g. a feedback monitor having a digital signal processor (DSP).

Although various specific embodiments have been described above, it will be appreciated that the teachings may be readily applied to additional implementations. Further, various physical implementations may be possible depending upon various additional considerations, such as manufacturing requirements and/or capabilities, particular system requirements, as well as other considerations. For example, the lasers may be provided as individual physical components. The optical splitters may be provided as a number of separate components, each that provides, for example, optical splitters for 4 lasers. Alternatively, the optical splitters may be provided on the same photonic chip as the optical modulators. The optical modulators may be provided as individual components that are combined together, or may be provided as a single component that provides the modulation of the signals. Accordingly, one of ordinary skill in the art will readily appreciate that the teachings provided herein may be used to provide numerous different system implementations utilizing the described optical power system to provide conversion of a digital electrical signal to an analog optical signal.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

What is claimed is:

1. An optical power supply comprising:
a plurality of lasers each providing an output at a respective optical wavelength and optical power;
a plurality of optical splitter groups, each comprising an input associated with a respective one of the plurality of lasers and splitting the input into a plurality of outputs each having an output power approximated by:

$$Power_n = \frac{1}{x^n} Power_{input},$$

where:
x is an integer greater than 1;
n is a number of the outputs of the optical splitter group and n=1 ... m;
m is a total number of outputs of the optical splitter group;
$Power_n$ is the output power of the $n^{th}$ output; and
$Power_{input}$ is the optical power of the output of the laser received at the input of the optical splitter group; and
a plurality of optical modulator groups each comprising a plurality of modulator inputs and associated modulator outputs, each of the plurality of modulator inputs of a respective optical modulator group connected to a respective output from different optical splitting groups such that, for each modulator group, data bit $data_i$ modulates an optical input having a $(w-i)^{th}$ highest optical power of the optical modulator group where:
$data_i$ is the $i^{th}$ bit in the data signal and i=0 ... w −1, where $data_{w-1}$ is the most significant bit; and
w is the number of bits in the data signal.

2. The optical power supply of claim 1, wherein at least one of the plurality of optical splitter groups comprises an asymmetrically arranged tree of individual optical splitters each splitting an input into approximately equal outputs.

3. The optical power supply of claim 2, wherein each of the individual optical splitters split power of the input unequally so that an output connected to additional individual optical splitters receives additional power.

4. The optical power supply of claim 3, wherein the additional power accounts for optical power loss resulting from individual optical splitters so that the outputs of the respective optical splitter group are a binary sequence of fractional power.

5. The optical power supply of claim 1, wherein x=2.

6. The optical power supply of claim 1, wherein the respective optical wavelengths of each of the plurality of lasers are separated by a distance sufficient to prevent generation of beat frequencies when the respective optical wavelengths are combined.

7. An optical system comprising:
an optical splitting section comprising a plurality of optical splitter groups, each comprising an input and splitting the input into a plurality of outputs each having an output power approximated by:

$$Power_n = \frac{1}{x^n} Power_{input},$$

where:
x is an integer greater than 1;
n is a number of the outputs of the optical splitter group and n=1 ... m;
m is a total number of outputs of the optical splitter group;
$Power_n$ is the output power of the $n^{th}$ output; and
$Power_{input}$ is the optical power received at the input of the optical splitter group;
an optical modulation section comprising a plurality of optical modulator groups each comprising a plurality of modulator inputs and associated modulator outputs, each of the modulator groups modulating optical inputs according to an associated bit of a respective one of a plurality of data signals; and
an optical interconnect section connecting individual outputs of the optical splitter groups to individual modulator inputs of the optical modulator groups, each of the plurality of modulator inputs of a respective optical modulator group connected to a respective output from different optical splitting groups such that, for each modulator group, data bit $data_i$ modulates an optical input having a $(w-i)^{th}$ highest optical power of the optical modulator group,
where:
$data_i$ is the $i^{th}$ bit in the data signal and i=0 ... w−1, where $data_{w-1}$ is the most significant bit; and
w is the number of bits in the data signal.

8. The optical system of claim 7, wherein at least one of the plurality of optical splitter groups comprises an asymmetrically arranged tree of individual optical splitters each splitting an input into approximately equal outputs.

9. The optical system of claim 8, wherein each of the individual optical splitters split power of the input unequally so that an output connected to additional individual optical splitters receives additional power.

10. The optical system of claim 9, wherein the additional power accounts for optical power loss resulting from individual optical splitters so that the outputs of the respective optical splitter group are a binary sequence of fractional power.

11. The optical system of claim 7, wherein x=2.

12. The optical system of claim 7, further comprising a plurality of lasers each providing an output at a respective optical wavelength and optical power, each of the lasers connected to the input of a respective one of the optical splitter groups.

13. The optical power supply of claim 12, wherein the respective optical wavelengths of each of the plurality of lasers are separated by a distance sufficient to prevent generation of beat frequencies when the respective optical wavelengths are combined.

14. The optical power supply of claim 7, further comprising a plurality of optical multiplexers each multiplexing a multi-wavelength signal of modulated outputs from a respective one of the optical modulation groups into a single analog optical signal.

* * * * *

UNITED STATES PATENT AND TRADEMARK OFFICE
CERTIFICATE OF CORRECTION

PATENT NO. : 9,490,902 B2
APPLICATION NO. : 14/595849
DATED : November 8, 2016
INVENTOR(S) : Dominic John Goodwill Page 1 of 1

It is certified that error appears in the above-identified patent and that said Letters Patent is hereby corrected as shown below:

On the Title Page

Under Assignee: "Shenzhen, Guangdon (CN)" should be "Shenzhen, Guangdong (CN)".

In the Specification

Column 3, Line 42: "optical carrier wave that can" should be "optical carrier waves that can".
Column 4, Line 27: "different lasers may used" should be "different lasers may be used".
Column 6, Lines 19-20: "optical multiplexers may located" should be "optical multiplexers may be located".
Column 8, Line 6: "depicted as spitting the optical power" should be "depicted as splitting the optical power".
Column 8, Line 44: "FIG. 4 components of" should be "FIG. 4 depicts components of".
Column 9, Line 24: "associated with different laser" should be "associated with different lasers".
Column 9, Line 49: "S0$_3$ 512a" should be "S0$_0$ 512a".
Column 9, Line 52: "S0$_2$ 512b" should be "S0$_1$ 512b".
Column 9, Line 55: "S0$_1$ 512c" should be "S0$_2$ 512c".
Column 9, Lines 57-58: "S0$_0$ 512d" should be "S0$_3$ 512d".
Column 10, Line 1: "multiplies by the" should be "multiplied by the".
Column 10, Line 16: "detect the analog optical signal provide" should be "detect the analog optical signal and provide".

In the Claims

Column 13, Line 36: "data w-1" should be "data$_{w-1}$".

Signed and Sealed this
Fourteenth Day of February, 2017

Michelle K. Lee
*Director of the United States Patent and Trademark Office*